United States Patent [19]
Isono

[11] Patent Number: 5,270,713
[45] Date of Patent: Dec. 14, 1993

[54] DECODE CIRCUIT CAPABLE OF DECREASING THE AMOUNT OF HARDWARE REQUIRED BY SELECTIVELY USING ONE OF A PLURALITY OF CLOCK SIGNALS

[75] Inventor: Kazuya Isono, Tokyo, Japan

[73] Assignee: NEC Corporation, Tokyo, Japan

[21] Appl. No.: 917,991

[22] Filed: Jul. 24, 1992

[30] Foreign Application Priority Data

Jul. 24, 1991 [JP] Japan ................................. 3-207455

[51] Int. Cl.$^5$ ............................................ H03M 7/00
[52] U.S. Cl. ............................................ 341/55; 375/106
[58] Field of Search ...................... 341/50, 51, 52, 55, 341/106; 375/20, 106, 110, 111, 116

[56] References Cited
U.S. PATENT DOCUMENTS

| | | | |
|---|---|---|---|
| 4,984,249 | 1/1991 | Long et al. .............................. | 375/20 |
| 5,093,841 | 3/1992 | Vancraeynest .......................... | 375/1 |

Primary Examiner—A. D. Pellinen
Assistant Examiner—Brian K. Young
Attorney, Agent, or Firm—Foley & Lardner

[57] ABSTRACT

In a decode circuit comprising a decoding section for decoding an input signal in response to a controlled clock signal into an intermediate signal having a variable pattern, the decode circuit comprises a clock generator section for generating first through N-th clock signals having first through N-th phases different from one another, respectively, where N represents a positive integer which is not less than two. The first through the N-th clock signals are selectively used as the controlled signal. When the variable pattern of the intermediate signal is identical with a predetermined pattern, a coincidence detecting section supplies the detecting section with a selected one of the first through the N-th clock signals as the controlled clock signal. When the variable pattern of the intermediate signal is identical with the predetermined pattern in the coincidence detecting section, an output section allows the intermediate signal as an output signal to pass therethrough.

1 Claim, 6 Drawing Sheets

DECODE CIRCUIT CAPABLE OF DECREASING THE AMOUNT OF HARDWARE REQUIRED BY SELECTIVELY USING ONE OF A PLURALITY OF CLOCK SIGNALS

BACKGROUND OF THE INVENTION

This invention relates to a decode circuit for decoding an input signal into an output signal. It is noted throughout the instant specification that the input signal may be considered as a frame synchronization signal which is followed by a data signal, although this invention is not restricted to decoding the frame synchronization signal.

A decode circuit of the type described decodes frame synchronization signal in synchronism with a clock signal into a decoded signal or an intermediate signal having a variable pattern. When the variable pattern of the intermediate signal is identical with a predetermined pattern, the decode circuit outputs the intermediate signal as an output signal.

In order to obtain the output signal, it is necessary to vary the clock signal into a varied clock signal which has a phase different from a phase of the clock signal in accordance with the intermediate signal. Namely, such a varied clock signal must be traced with time to correctly obtain the output signal.

Inasmuch as the varied clock signal must be traced with time, the decode circuit is disadvantageous in that the amount of hardware required increases.

SUMMARY OF THE INVENTION

It is an object of this invention to provide a decode circuit which is capable of decreasing the amount of required hardware.

Other objects of this invention will become clear as the description proceeds.

According to this invention, there is provided a decode circuit for decoding an input signal into an output signal. The decode circuit comprises decoding means for decoding the input signal in response to a controlled clock signal into an intermediate signal which has a variable pattern, clock generating means for generating first through N-th clock signals having first through N-th phases different from one another, respectively, where N represents a positive integer which is not less than two, supplying means for selectively supplying the first through the N-th clock signals as the controlled clock signal to the decoding means in accordance with the variable pattern of the intermediate signal, coincidence detecting means for detecting whether or not the variable pattern of the intermediate signal is identical with a predetermined pattern to supply the decoding means with a selected one of the first through the N-th clock signals as the controlled clock signal, when the variable pattern of the intermediate signal is identical with the predetermined pattern, and path means coupled to the coincidence detecting means for allowing the intermediate signal as the output signal to pass therethrough when the pattern of the intermediate signal is identical with the predetermined pattern in the coincidence detecting means.

DESCRIPTION OF THE PREFERRED EMBODIMENT

Figure 1:
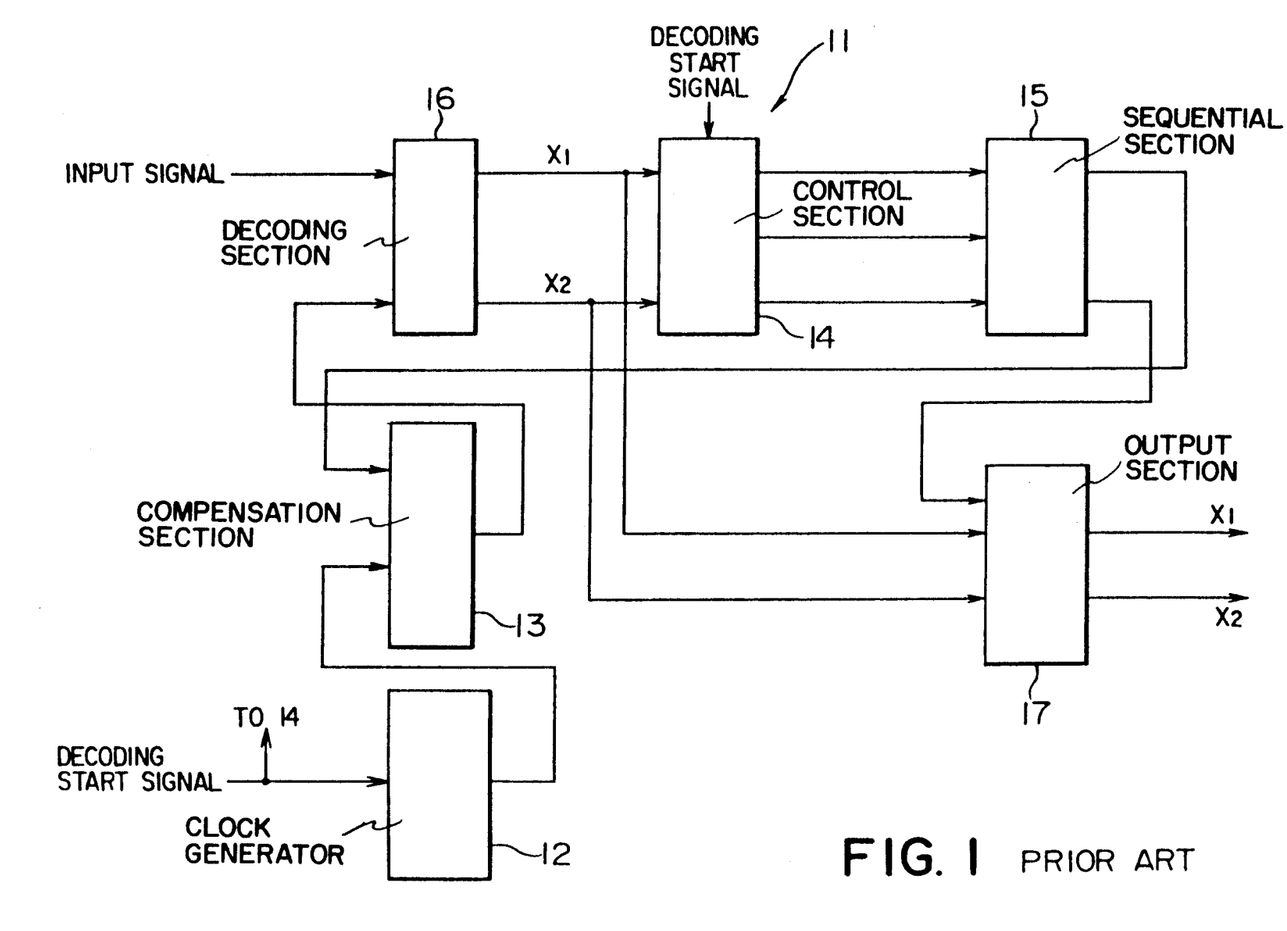
FIG. 1 is a block diagram of a conventional decode circuit.

Referring to FIG. 1, description will be made as regards a conventional decode circuit 11 for a better understanding of this invention. The decode circuit 11 is provided for decoding an input signal into an output signal in accordance with a controlled clock signal. The input signal may be a frame synchronization signal which is followed by a data signal. The frame synchronization and the data signals may be composed of 1-7 code. The frame synchronization signal may be composed of repetition of N bits, where N represents a positive integer which is not less than two. In the illustrated example, the integer N is assumed to be equal to three. More particularly, the frame synchronization signal is composed of repetition of "001".

On correctly decoding the data signal into a decoded data signal, the decode circuit 11 first must decode the frame synchronization signal into an intermediate signal which has a variable pattern. When the variable pattern of the intermediate signal is identical with a predetermined pattern, the decode circuit 11 outputs the intermediate signal as the output signal. The predetermined pattern may be identical with a binary pattern of "00". It is necessary to control the phase of the controlled clock signal in order to obtain the intermediate signal having the predetermined pattern.

The decode circuit 11 comprises a clock generator 12 which generates a clock signal in response to a decoding start signal DS to supply the clock signal to a compensation section 13. The decoding start signal is also given to a control section 14. The control section 14 supplies a first state signal to a sequential section 15 in response to the decoding start signal. Supplied with the first state signal, the sequential section 15 supplies a first hold signal to the compensation section 13. Responsive to the first hold signal, the compensation section 13 compensates the clock signal into a first clock signal which has a first phase. The first clock signal is supplied as the controlled clock signal from the compensation section 13 to a decoding section 16.

The decoding section 16 is operable to decode the frame synchronization signal into the intermediate signal in accordance with the controlled clock signal which is supplied from the compensation section 13. In the illustrated example, the intermediate signal may be a non-return-to-zero (NRZ) signal which is composed of a first bit X1 and a second bit X2. When the first bit X1 takes a logic "1", the second bit X2 takes a logic "1" or "0". When the first bit X1 takes the logic "0", the second bit X2 takes the logic "0". Namely, the intermediate signal takes one of the three binary patterns (1,1), (1,0), or (0,0).

It is assumed that the intermediate signal takes the binary pattern of (1,1) when the first clock signal is supplied as the controlled clock signal from the compensation section 13 to the decoding section 16. When the intermediate signal takes the binary pattern (1,1), the control section 14 produces a second state signal SB. Responsive to the second state signal SB, the sequential section 16 supplies a second hold signal to the compensation section 13. Supplied with the second hold signal, the compensation section 13 compensates the first clock signal into a second clock signal which has a second phase that is different from the first phase. The second phase may be different from the first phase by a phase difference of 120°.

It is assumed that the intermediate signal represents the binary pattern (1,0) when the second clock signal is supplied as the controlled clock signal from the compensation section 13 to the decoding section 16. When the intermediate signal takes the binary pattern (1,0), the control section 14 produces a third state signal SC. Responsive to the third state signal SC, the sequential section 16 supplies a third hold signal to the compensation section 13. Supplied with the third hold signal, the compensation section 13 compensates the second clock signal into a third clock signal which has a third phase that is different from the first and the second phases. The third phase may be different from both of the first and the second phases by a phase difference of 120°.

In accordance with the third clock signal, the decoding section 16 decodes the frame synchronization signal into the intermediate signal having the predetermined pattern, namely, the binary pattern (0,0). When the predetermined pattern is detected by the control section 14, the control section 14 stops supply of all of the first through the third state signals SA to SC so that the sequential section 16 continues to produce the third hold signal and produces an establishing signal. Responsive to the establishing signal, the compensation section 13 continues to supply the third clock signal to the decoding section 16.

The establishing signal is also delivered from the sequential section 15 to an output section 17. Supplied with the establishing signal, the output section 17 allows the intermediate signal, as the output signal, to pass therethrough.

As described above, the conventional decode circuit must have the compensation section 13 and the sequential section 15 in order to control the controlled signal. As a result, the amount of hardware required increases in the conventional decode circuit.

Figure 2:
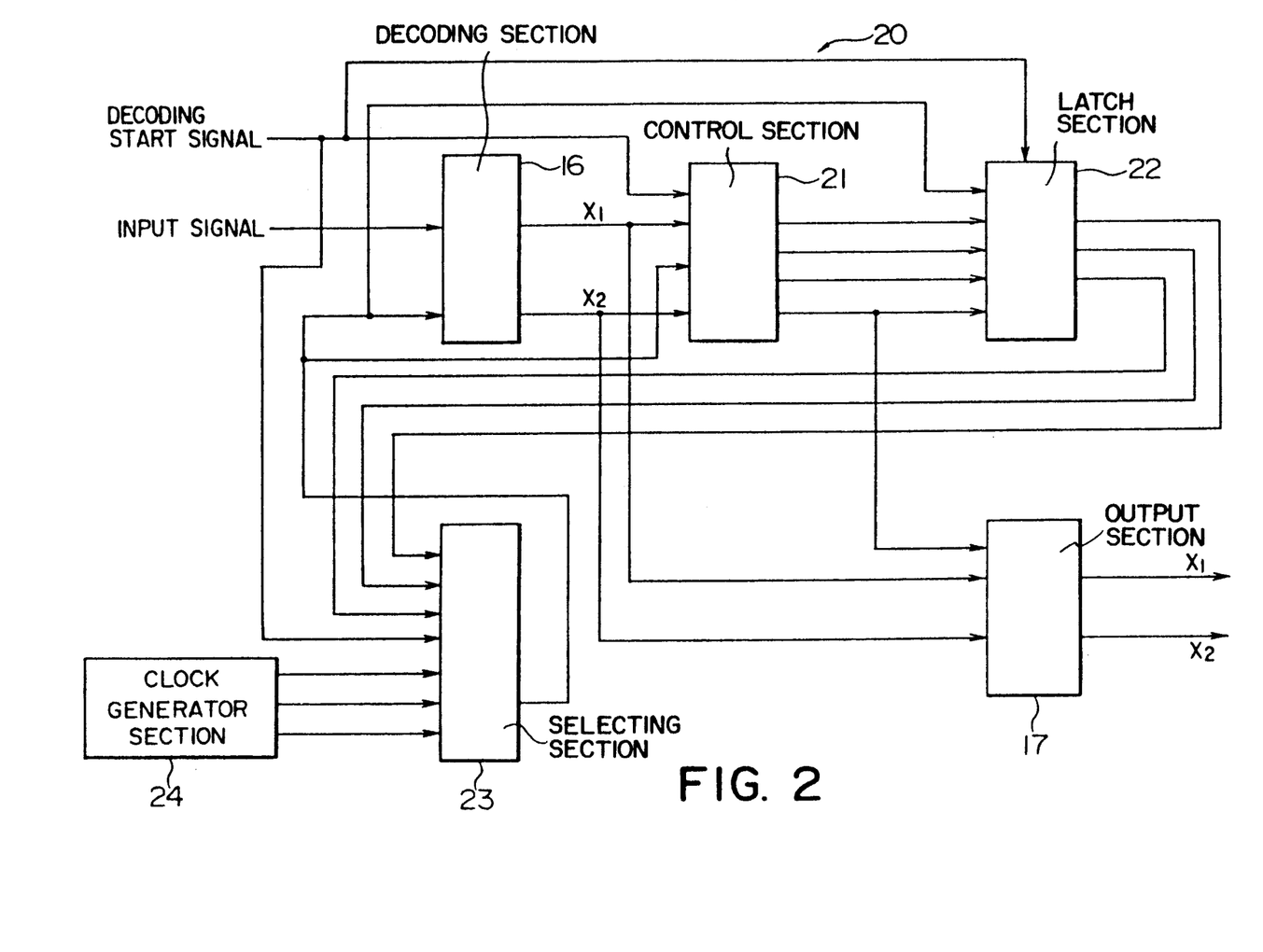
FIG. 2 is a block diagram of a decode circuit according to a preferred embodiment of this invention.

Referring to FIG. 2, description will proceed to a decode circuit according to a preferred embodiment of this invention. The illustrated decode circuit is different in structure from the decode circuit 11 illustrated with reference to FIG. 1 and is therefore designated afresh by a reference number 20. The decode circuit 20 comprises similar parts which are designated by like reference numerals and are operable with likewise named signals. The decode circuit 20 comprises a control section which is different from the control section 14 illustrated in FIG. 1 and which is therefore designated by a different reference numeral 21. The decode circuit 20 further comprises a latch section 22, a selecting section 23, and a clock generator section 24.

Figure 3:
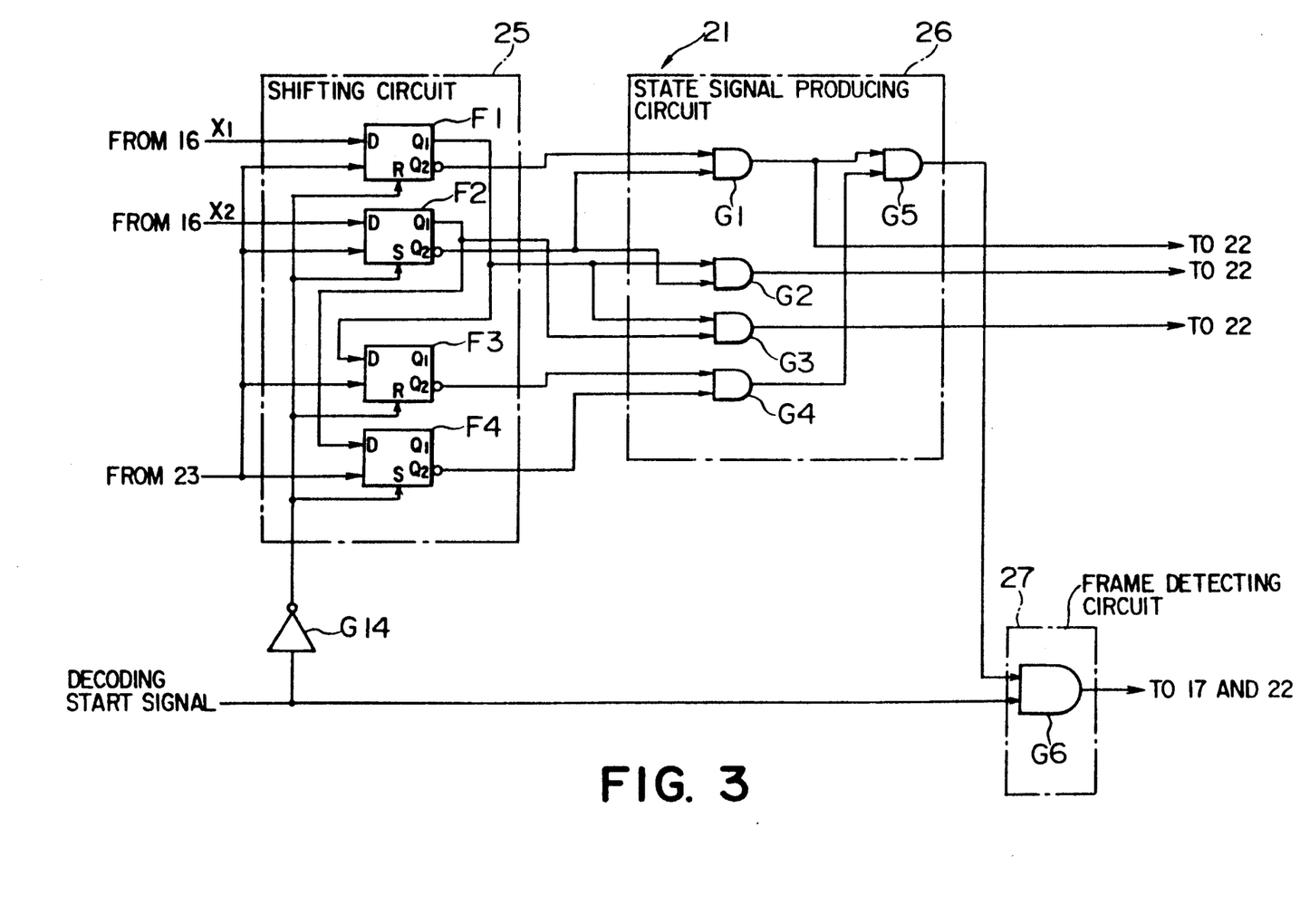
FIG. 3 is a logic circuit of a control section illustrated in FIG. 2.

Referring to FIG. 3, the control section 21 comprises a shifting circuit 25, a state signal producing circuit 26, and a frame detecting circuit 27. The shifting circuit 25 comprises delay (D) flip-flops F1 to F4, each of which is operated by an operation clock signal. The state signal producing circuit 26 comprises AND gates G1 to G5. The detecting circuit 27 comprises an AND gate G6.

In the shifting circuit 25, each of the delay flip-flops F1 to F4 has first and second output terminals labelled "Q1" and "Q2", respectively. The second output terminal Q2 is used as an inverted terminal. Each of the delay flip-flops F1 to F4 has an input terminal labelled "D". The first output terminal Q1 of the delay flip-flop F1 is connected to the AND gates G2 and G3 and the input terminal D of the delay flip-flop F3. The second output terminal Q2 of the delay flip-flop F1 is connected to the AND gate G1. The first output terminal Q1 of the delay flip-flop F2 is connected to the AND gate G3 and the input terminal D of the delay flip-flop F4. The second output terminal Q2 of the delay flip-flop F2 is connected to the AND gates G1 and G2. The second output terminal Q2 of the delay flip-flop F3 is connected to the AND gate G4. The second output terminal Q2 of the delay flip-flop F4 is connected to the AND gate G4. The AND gates G1 and G4 are connected to the AND gate G5.

Therefore, the AND gate G1 produces a first AND'ed signal having a logic "1" level when a logic "1" level appears at the second output terminal Q2 of the delay flip-flop F1 and a logic "1" level appears at the second output terminal Q2 of the delay flip-flop F2. When a logic "1" level appears at the first output terminal Q1 of the delay flip-flop F1 and a logic "1" level appears at the second output terminal Q2 of the delay flip-flop F2, the AND gate G2 produces a second AND'ed signal having a logic "1" level. When a logic "1" level appears at the first output terminal Q1 of the delay flip-flop F1 and a logic "1" level appears at the first output terminal Q1 of the delay flip-flop F2, the AND gate G3 produces a third AND'ed signal having a logic "1" level. When a logic "1" level appears at the second output terminal Q2 of the delay flip-flop F3 and a logic "1" level appears at the second output terminal Q2 of the delay flip-flop F4, the AND gate G4 produces a fourth AND'ed signal having a logic "1" level. Responsive to the first and the fourth AND'ed signals, the AND gate G5 produces a fifth AND'ed signal having a logic "1" level. The first through the third AND'ed signals are supplied as first through third state signals to the latch section 22 (FIG. 2).

Figure 4:
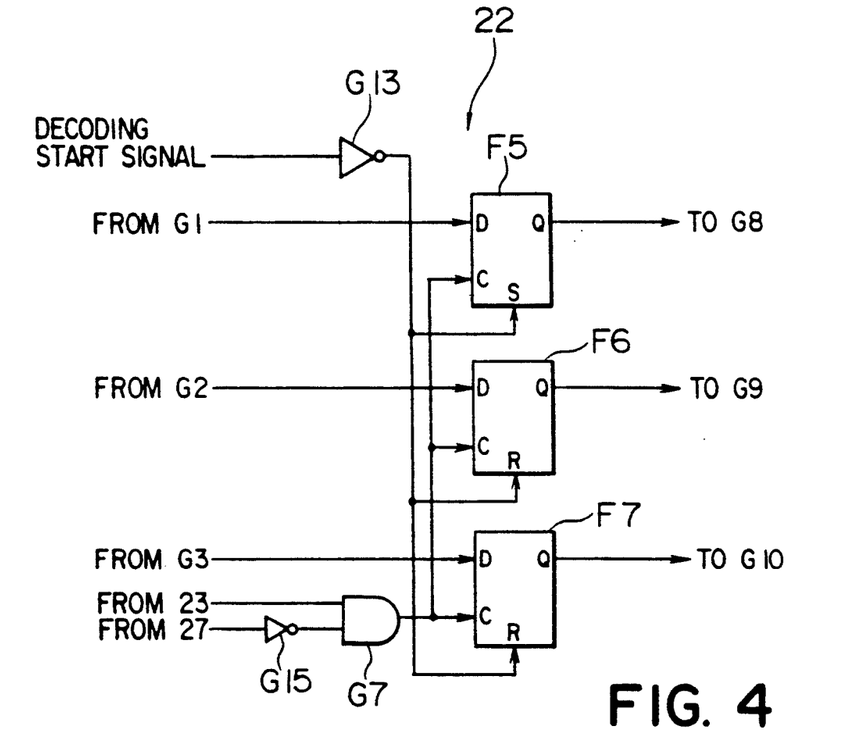
FIG. 4 is a logic circuit of a latch section illustrated in FIG. 2.

Referring to FIG. 4, the latch section 22 comprises delay flip-flops F5 to F7 and an AND gate G7. The delay flip-flops F5 to F7 are operated by an operation clock signal which is supplied at a clock input terminal labelled "C". Each of the delay flip-flops F5 to F7 has an output terminal labelled "Q", an input terminal labelled "D", a clock terminal C, a set terminal S, and a reset terminal R. The set terminal S alone is shown in connection with the delay flip-flop F5 while the reset terminals R alone are shown in connection with the flip-flops F6 and F7. When a logic "1" level appears at the input terminal D of the delay flip-flop F5, the delay flip-flop F5 produces a first strove signal having a logic "1" level. Similarly, the delay flip-flop F6 produces a second strove signal having a logic "1" level when a logic "1" level appears at the input terminal D of the delay flip-flop F6. When a logic "1" level appears at the input terminal D of the delay flip-flop F7, the delay flip-flop F7 produces a third strove signal having a logic "1" level.

Figure 5:
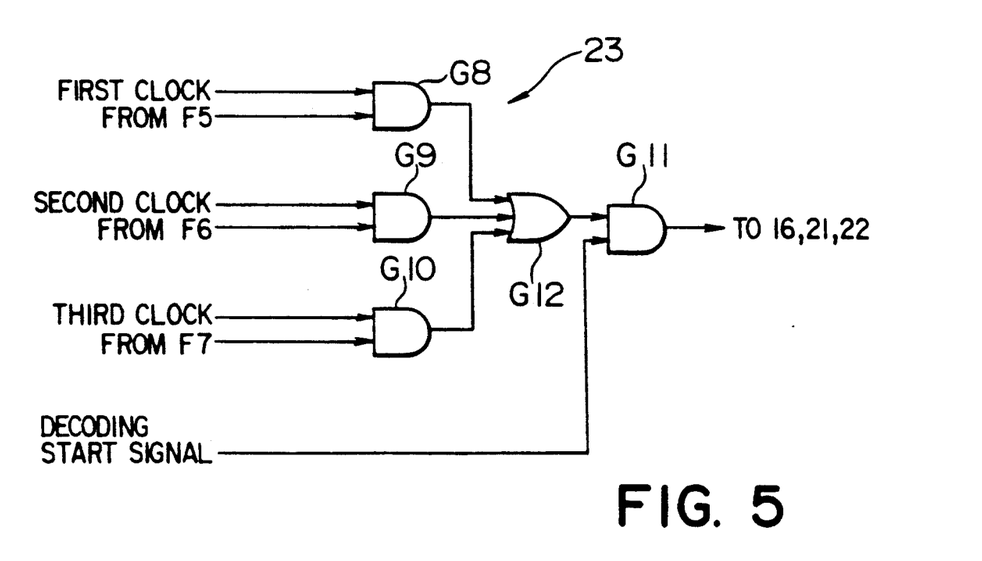
FIG. 5 is a logic circuit of a selecting section illustrated in FIG. 2.

Referring to FIG. 5 together with FIG. 2, the selecting section 23 comprises AND gates G8 to G11 and an OR gate G12.

Turning back to FIG. 2, the clock generator section 24 generates first through N-th clock signals having first through N-th phases different from one another, respectively. In the illustrated example, the clock generator section 23 generates first through third clock signals having first through third phases different from one another by phase differences of 120°. The first through the third clock signals are supplied to the selecting section 24.

Figure 6:
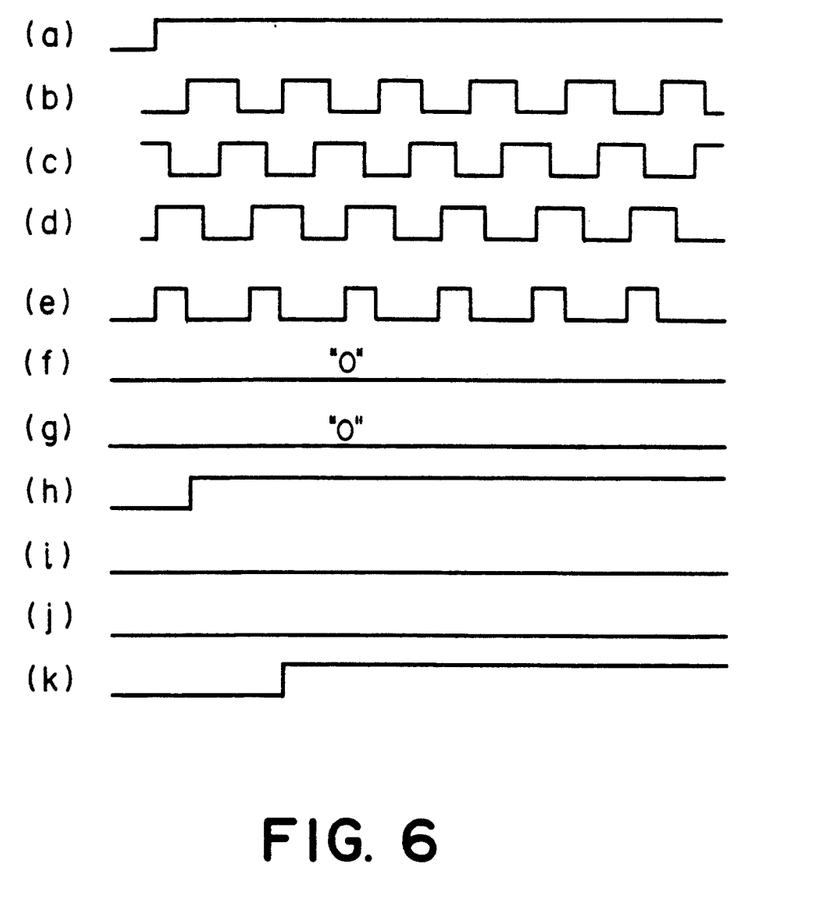
FIG. 6 is a time chart for describing an operation of the decode circuit illustrated in FIG. 2.

Referring to FIG. 2 in addition to FIGS. 4 and 6, description will at first proceed to the latch section 22 for a better understanding of this embodiment. When the decode circuit 20 starts a decoding operation, the decoding circuit 20 is given the decoding start signal from an external device (not shown). The decoding start signal is delivered to the control section 21, the latch section 22, and the selecting section 23, as shown in FIG. 2. The decoding start signal has a logic "1" level as shown along a first or a top row labelled (a) in FIG. 6.

In the latch section 22, the decoding start signal is supplied through an inverter G13 (FIG. 4) to the delay flip-flops F5 to F7. When a logic "1" level is supplied to the set terminal S of the delay flip-flop F5, the delay flip-flop F5 is put into a set state to produce the logic "1" level at the output terminal Q of the delay flip-flop F5. Simultaneously, the logic "1" level is supplied to the reset terminal R of each of the delay flip-flops F6 and F7 to put each of the delay flip-flops F6 and F7 into reset states, namely, initial states. As a result, a logic "0" level appears at the output terminal Q of each of the delay flip-flops F6 and F7.

Before the decoding start signal DS is given to the latch section 22, the logic "0" level is supplied to the latch section 22. In this event, the set terminal S of the delay flip-flop F5 and the reset terminal R of the delay flip-flops F6 and F7 are given the logic "1" level. As a result, only the delay flip-flop F5 produces the first strove signal prior to reception of the decoding start signal. The first strove signal is delivered to the selecting section 23 (FIG. 2).

It is to be noted here that the selecting section 23 always receives, from the clock generator section 24, the first through the third clock signals shown along second through fourth rows labelled (b) to (d) in FIG. 6.

Referring to FIG. 5, the first through the third clock signals are supplied to the AND gates G8 to G10, respectively. The first strove signal is supplied from the flip-flop F5 (FIG. 4) to the AND gate G8. Therefore, only the AND gate G8 produces an AND'ed signal of the logic "1" synchronized with the first clock signal. The AND'ed signal is delivered through the OR gate G12 to the AND gate G11. The AND gate G11 also receives the decoding start signal to supply the first clock signal to the decoding section 16, the control section 21, and the latch section 22. Namely, the selecting section 23 selects the first clock signal from the first through the third clock signals during the reception of the first strove signal. The first clock signal is used as the controlled clock signal in the decoding section 16. The first clock signal is used as the operation clock signal in the control section 21 and the latch section 22.

Referring to FIGS. 2 and 6, the decoding section 16 receives the frame synchronization signal of 1–7 code shown along a fifth row labelled (e) in FIG. 6. The decoding section 16 decodes the frame synchronization signal into the intermediate signal having the variable pattern in accordance with the first clock signal.

It is assumed that the intermediate signal has the predetermined pattern when the decoding section 16 decodes the synchronization signal into the intermediate signal in accordance with the first clock signal. Specifically, each of the first and the second bits X1 and X2 of the intermediate signal takes the logic "0", respectively, as shown along sixth and seventh rows labelled (f) and (g) in FIG. 6. The intermediate signal is supplied to the control section 21, as depicted at X1 and X2.

Referring to FIG. 3 in addition to FIGS. 2 and 6, each of the delay flip-flops F1 and F3 in the control section 21 has a reset terminal labelled "R". Each of the delay flip-flops F2 and F4 has a set terminal labelled "S". The above-mentioned decoding start signal is given through an inverter G14 to the delay flip-flops F1 to F4.

Before the decoding start signal is given to the control section 21, each of the delay flip-flops F1 and F3 receives the logic "1" level at its reset terminal R. Consequently, each of the delay flip-flops F1 and F3 is put into the reset state prior to the reception of the decoding start signal DS. On the other hand, each of the delay flip-flops F2 and F4 receives the logic "1" level at its set terminal S. Each of the delay flip-flops F2 and F4 is put into the set state.

Under the circumstances, when the decoding start signal of the logic "1" level is supplied to the control section 21, each of the delay flip-flops F1 and F3 is given the logic "0" level at its reset terminal R. Similarly, each of the delay flip-flops F2 and F4 is also given the logic "0" level at its set terminal S.

As described above, the intermediate signal is supplied to the control section 21. The first clock signal is also supplied as the operation clock signal to the control section 21 for operating the delay flip-flops F1 to F4. More particularly, the first bit X1 of the intermediate signal is given to the delay flip-flop F1 while the second bit X2 of the intermediate signal is given to the delay flip-flop F2.

When each of the first and the second bits X1 and X2 takes the logic "0", the logic "0" level appears at the first output terminal Q1 of the delay flip-flops F1 and F2. This shows that the logic "1" level appears at the second output terminal Q2 of each delay flip-flop F1 and F2. On the other hand, the logic "1" level appears at the second output terminal Q2 of each delay flip-flop F3 and F4.

When the logic "1" level appears at both of the second output terminals Q2 of the delay flip-flops F1 and F2, the AND gate G1 produces the first AND'ed signal of the logic "1" level. Similarly, the AND gate G4 produces a second AND'ed signal of the logic "1" level when the logic "1" level appears at both of the second output terminals Q2 of the delay flip-flops F3 and F4. The first AND'ed signal is supplied to the latch section 22 as the first state signal shown along an eighth row labelled (h) in FIG. 6. At this time, each of the AND gates G2 and G3 produces the logic "0" level signal. Namely, the AND gates G2 and G3 do not produce the second and the third state signals, respectively, as shown along ninth and tenth rows (i) and (j) in FIG. 6. The AND gate G5 is responsive to the first and the second AND'ed signals to produce the fifth AND'ed signal. The fifth AND'ed signal is delivered to the frame detecting circuit 27. The AND gate G6 is supplied with the fifth AND'ed signal and the decoding start signal to produce a frame detecting signal shown along an eleventh row labelled (k) in FIG. 6. The frame detecting signal is supplied to the output section 17 and the latch section 22 (FIG. 2).

Referring again to FIG. 4, the frame detecting signal is supplied to the AND gate G7 through an inverter G15. Before the frame detecting signal DS is supplied to the latch section 22, the AND gate G7 receives the logic "1" level signal and the first clock signal. Therefore, the AND gate G7 produces an AND'ed signal of the logic "1" level in synchronism with the first clock signal. The first clock signal is supplied as the operation clock signal to the delay flip-flops F5 to F7.

When the frame detecting signal is supplied to the latch section 22, the AND gate G7 stops supplying the first clock signal to the delay flip-flops F5 to F7. Concurrently, the first state signal is already supplied to the delay flip-flop F5. Therefore, the delay flip-flop F5 holds the logic "1" level and continues to supply the first strove signal to the selecting section 23 (FIG. 2). The selecting section 23 continuously supplies the first clock signal as the controlled clock signal to the decoding section 16.

Turning back to FIG. 2, the output section 17 is responsive to the frame detecting signal and allows the intermediate signal as the output signal to pass therethrough during reception of the frame detecting signal.

Figure 7:
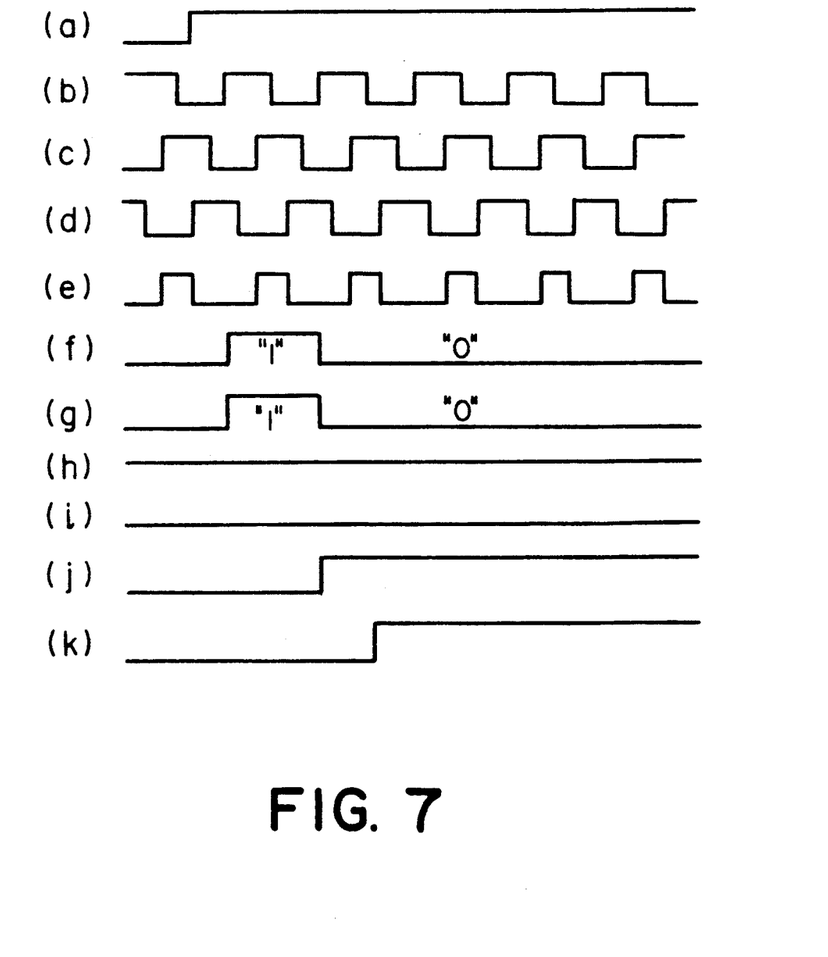
FIG. 7 is a time chart for describing another operation of the decode circuit illustrated in FIG. 2.

Referring to FIG. 7 along with FIG. 2, description will be made as regards another operation of the decode circuit 20. The latch section 22 supplies the first strove signal to the selecting section 23 before the latch section 22 receives the decoding start signal DS shown along a first or a top row labelled (a) in FIG. 7. The selecting section 23 always receives, from the clock generator section 24, the first through the third clock signals shown along second through fourth rows labelled (b) to (d) in FIG. 7. The selecting section 23 selects the first clock signal from the first through the third clock signals in accordance with the first strove signal.

The decoding section 16 receives the frame synchronization signal of the 1–7 code shown along a fifth row labelled (e) in FIG. 7. The decoding section 16 decodes the frame synchronization signal into the intermediate signal having the variable pattern, in accordance with the first clock signal.

It is assumed that the intermediate signal does not have the predetermined pattern when the decoding section 16 decodes the synchronization signal into the intermediate signal in accordance with the first clock signal. More specifically, each of the first and the second bits X1 and X2 of the intermediate signal takes the logic "1" level, as shown along sixth and seventh rows labelled (f) and (g) in FIG. 7. The intermediate signal is supplied to the control section 21.

Referring to FIG. 3 together with FIG. 7, the logic "1" level appears at the first output terminal Q1 of the delay flip-flops F1 and F2 inasmuch as each of the first and the second bits X1 and X2 takes the logic "1" level. The logic "0" level appears at the second output terminal Q2 of each delay flip-flops F3 and F4. Likewise, the logic "0" level appears at the second output terminal Q2 of each delay flip-flop F1 and F2. As a result, the AND gates G1 and G2 do not produce the first and the second state signals, respectively, as shown along eighth and ninth rows labelled (h) and (i) in FIG. 7. The AND gate G3 produces the third state signal as shown along a tenth row labelled (j) in FIG. 7. Inasmuch as the AND gate G5 does not produce the fifth AND'ed signal, the AND gate G6 does not produce the frame detecting signal.

Referring again to FIG. 4, the first clock signal is supplied as the operation clock signal to the delay flip-flops F5 to F7 inasmuch as the frame detecting signal is not supplied to the latch section 22. At that time, the detecting start signal is already supplied through the inverter G13 to the delay flip-flops F5 to F7. Therefore, the delay flip-flop F5 is set to the logic "0" level. Each of the delay flip-flops F6 and F7 holds a logic "0" level. The third state signal is supplied to the input terminal D of the delay flip-flop F7. The delay flip-flop F7 outputs the third strove signal from its output terminal Q. The third strove signal is supplied to the selecting section 23 (FIG. 2). Otherwise, the delay flip-flop F5 stops producing the first strove signal.

Referring to FIG. 5, the AND gate G10 supplies the third clock signal through the OR gate G12 to the AND gate G11 in response to the third strove signal. The AND gate G11 supplies the third clock signal to the decoding section 16, the control section 21, and the latch section 22 (FIG. 2) in response to the decoding start signal.

Turning back to FIG. 2, the decoding section 16 decodes the synchronization signal into the intermediate signal in accordance with the third clock signal used as the controlled clock signal. It is assumed that the intermediate signal has the predetermined pattern when the decoding section 16 decodes the synchronization signal into the intermediate signal in accordance with the third clock signal. Namely, each of the first and the second bits X1 and X2 of the intermediate signal takes the logic "0" level. The intermediate signal is delivered to the control section 21.

Inasmuch as the intermediate signal has the predetermined pattern, the control section 21 stops producing the third state signal and supplies the first state signal to the latch section 22. In addition, the control section 21 supplies the latch section 22 and the output section 17 with the frame detecting signal as shown along in eleventh row labelled (k) in FIG. 7.

Referring to FIG. 4, the AND gate G7 stops supplying the third clock signal to the delay flip-flops F5 to F7 when the frame detecting signal is supplied to the latch section 22. Therefore, the delay flip-flop F7 continues to supply the third strove signal to the selecting section (FIG. 2). Otherwise, the delay flip-flops F5 and F6 do not produce the first and the second strove signals, respectively.

What is claimed is:

1. A decode circuit for decoding an input signal into an output signal, said decode circuit comprising:
   decoding means for decoding said input signal in response to a controlled clock signal into an intermediate signal having a variable pattern of first through N-th patterns, where N represents a positive integer which is not less than two;
   clock generating means for generating first through N-th clock signals having first through N-th phases different from one another, respectively;
   coincidence detecting means for detecting whether or not the variable pattern of said intermediate signal is identical to a predetermined pattern and for producing a detection signal whenever the variable pattern of said intermediate signal is identical to said predetermined pattern;
   control signal producing means for selectively producing first through N-th control signals in accordance with said first through said N-th patterns, respectively, said control signal producing means generating a specific one of said first through said N-th control signals in response to said detection signal;

selecting means for selecting said first through said N-th clock signals in accordance with said first through said N-th control signals, respectively, to supply said decoding means with each of said first through said N-th clock signals as said controlled clock signal, said selecting means selecting a specific one of said first through said N-th clock signals as said controlled clock signal in response to said specific control signal; and path means coupled to said coincidence detecting means for allowing said intermediate signal as said output signal to pass therethrough in response to said detection signal.

* * * * *